United States Patent [19]

Thorley

[11] Patent Number: 5,258,615
[45] Date of Patent: Nov. 2, 1993

[54] OPTICAL FIBER MONITORING BY DETECTION OF POLARIZATION VARIATIONS

[75] Inventor: Anthony M. Thorley, Warwickshire, England

[73] Assignee: GPT Limited, England

[21] Appl. No.: 939,421

[22] Filed: Sep. 3, 1992

Related U.S. Application Data

[63] Continuation of Ser. No. 729,701, Jul. 15, 1991, abandoned.

[30] Foreign Application Priority Data

Aug. 3, 1990 [GB] United Kingdom ............... 9017077

[51] Int. Cl.$^5$ .............................................. G01B 11/16
[52] U.S. Cl. ........................... 250/227.17; 250/225; 356/364; 356/365; 356/367; 359/192
[58] Field of Search .................. 250/227.17, 225; 356/364, 365, 366, 367; 369/13; 359/192, 156, 122

[56] References Cited

U.S. PATENT DOCUMENTS

| | | | |
|---|---|---|---|
| 4,442,350 | 4/1984 | Rashleigh | 250/227.19 |
| 4,488,040 | 12/1984 | Rowe | 250/227.14 |
| 4,817,206 | 3/1989 | Calvani et al. | 359/192 |
| 4,900,917 | 2/1990 | Dixon et al. | 250/225 |
| 4,922,095 | 5/1990 | Gergely | 250/225 |
| 4,979,235 | 12/1990 | Rumbaugh et al. | 359/192 |
| 4,989,200 | 1/1991 | Olshansky et al. | 359/192 |
| 5,003,626 | 3/1991 | Kuwahara et al. | 359/192 |
| 5,023,950 | 6/1991 | Tsushima et al. | 329/302 |
| 5,052,051 | 9/1991 | Naito et al. | 359/192 |
| 5,060,312 | 10/1991 | Delavaux | 359/192 |
| 5,081,348 | 1/1992 | Siddiqui | 250/225 |

*Primary Examiner*—Paul M. Dzierzynski
*Assistant Examiner*—James Beyer
*Attorney, Agent, or Firm*—Kirschstein, Ottinger, Israel & Schiffmiller

[57] ABSTRACT

The invention concerns apparatus for monitoring optical fibers by detecting variations in the polarization of light being transmitted through the fibers. In one embodiment the optical fibre carries non-coherent light and the incoming light is split by a passive splitter (2) connected to a polarization beam splitter (5). Variations in the output of this polarization beam splitter are detected, amplified and filtered so that they can be compared with a preset reference voltage. A counter (12) is used to detect variations. Another embodiment relates to the detection of polarization variations in coherent systems.

10 Claims, 3 Drawing Sheets

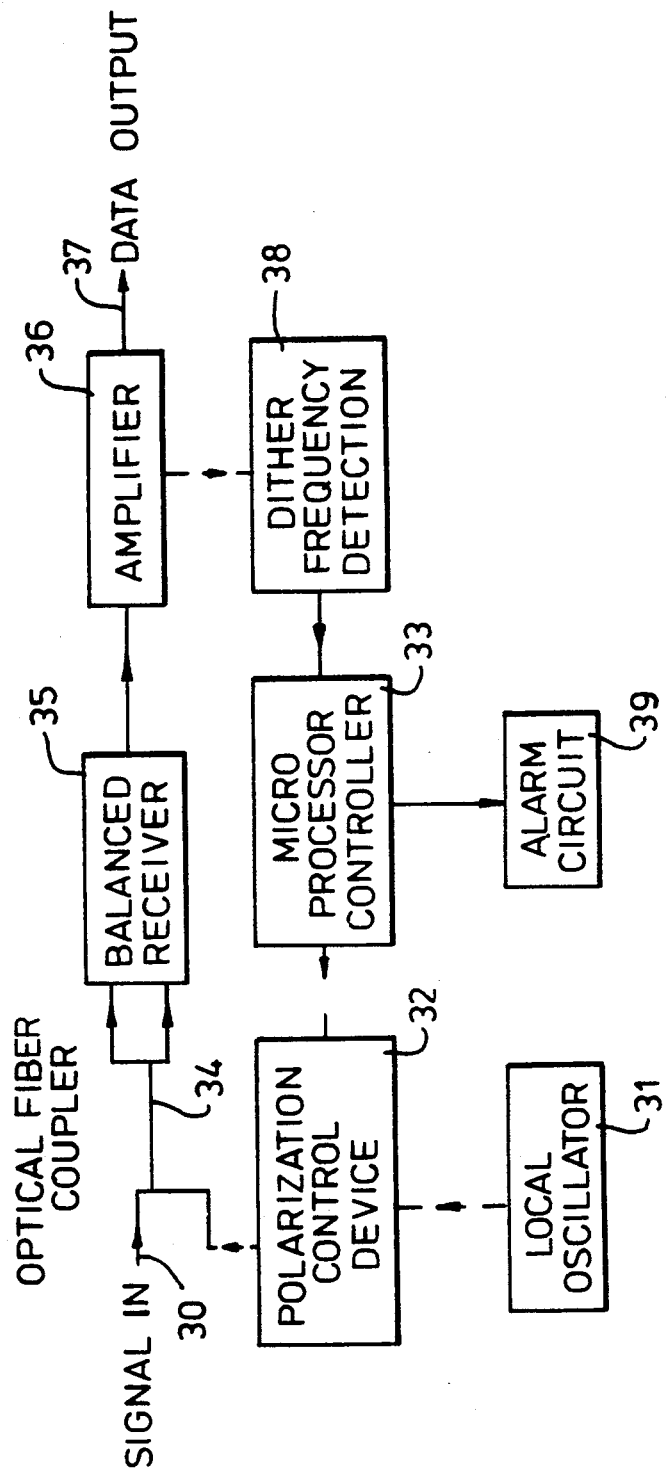

OPTICAL FIBER MONITORING BY DETECTION OF POLARIZATION VARIATIONS

BACKGROUND OF THE INVENTION

The present invention, a continuation of 07/729,701, filed Jul. 15, 1991, now abandoned concerns the monitoring of optical fibers.

These are becoming increasingly important in the field of data transmission. In optical fiber data transmission systems physical movement of the fibers can cause the transmission characteristics of the fibers to vary and it is becoming increasingly important to be capable of monitoring the outputs of optical fibers in such a manner as to be able to detect when the fibers have undergone unwanted perturbations. It is already known that movements of fibers carrying optical signals causes variation in the polarization of the light carrying the signals. The present invention proposes using this to monitor the fibers.

Accordingly the invention comprises means for detecting variations in the polarization of light being transmitted through an optical fiber being monitored.

SUMMARY OF THE INVENTION

In order that the present invention may be more readily understood various embodiments thereof will now be described by way of example and with reference to the accompanying drawings, in which:

BRIEF DESCRIPTION OF THE DRAWINGS

FIG. 2 is a block diagram of a second embodiment and FIG. 3 is a similar diagram of a third embodiment.

DETAILED DESCRIPTION OF THE PREFERRED EMBODIMENTS

Before describing the embodiments it will be appreciated that data transmission down an optical fiber can be carried out either with non-coherent light or with coherent light the polarization of which is controlled.

Figure 1:
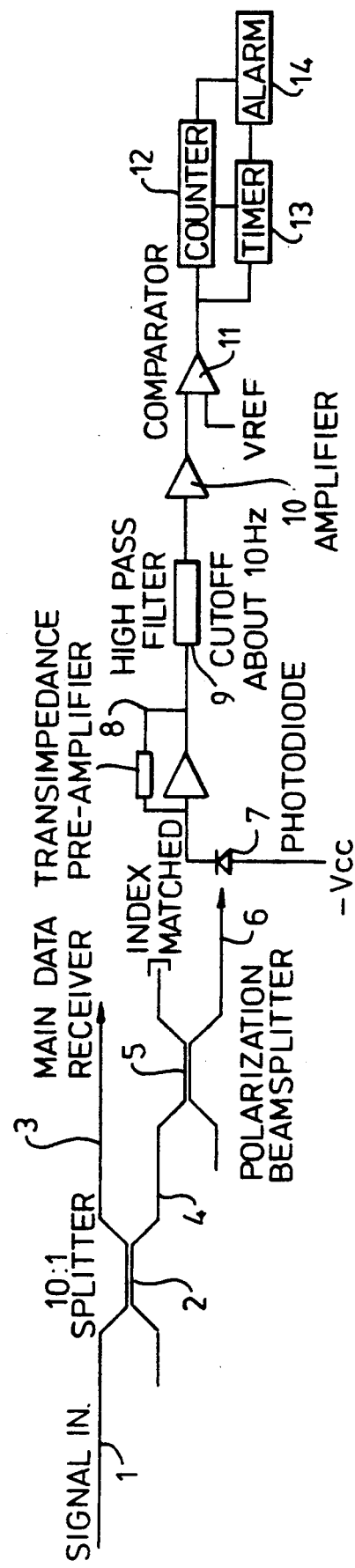
FIG. 1 is a block diagram of a first embodiment of a polarization fluctuation detector.

FIG. 1 shows a polarization fluctuation detector for monitoring the optical fibers of a non-coherent system. In FIG. 1 an incoming signal is shown at 1 and this signal is sampled by a 10:1 passive splitter 2. Such a splitter introduces less than 1 dB loss into the signal path. The main signal path continues at 3 to a main data receiver which is conventional and which is not shown in the drawing. The low ratio arm 4 of the splitter 2 is taken to a polarization beam splitter 5. As the polarisation of the signal light varies the power exiting the polarization beam splitter 5 from either arm will vary from 0 to the maximum beam splitter 5 power. Only one arm 6 of the polarization beam splitter 5 has to be monitored. The exiting light from this arm 6 is detected with a photodiode 7 and a transimpedance pre-amplifier 8 is used to convert the photo current into voltage fluctuations. This pre-amplifier 8 can have a much lower bandwidth than the main signal amplifier because only polarization fluctuation frequencies below 1 kHz are of interest. A high pass filter 9 removes frequencies below 10 Hz. This removes all polarization fluctuations caused by natural changes in the fiber characteristic which occur at frequencies below 1 Hz. The filtered signal is amplified in a gain stage indicated at 10 and the amplified signal compared with a pre-set reference voltage by a comparator 11. Under normal circumstances the output of comparator 11 will be constant. When the optical fibre being monitored is disturbed the comparator output will rapidly switch as the disturbances cause polarization fluctuation in the light signal. The changes of state of the comparator 11 are counted in a counter 12 and a timer 13 is triggered by the first output change of the comparator. After a pre-determined delay the timer 13 causes the conductor to be read. If the count of the counter 12 exceeds a preset value than an alarm 14 is triggered. The purpose of the counter and its associated timer together with filter 9 is to ensure that no alarm is triggered unless the fiber polarization changes at above 10 Hz for the time set by the timer. This is intended to eliminate false alarms.

Figure 2:
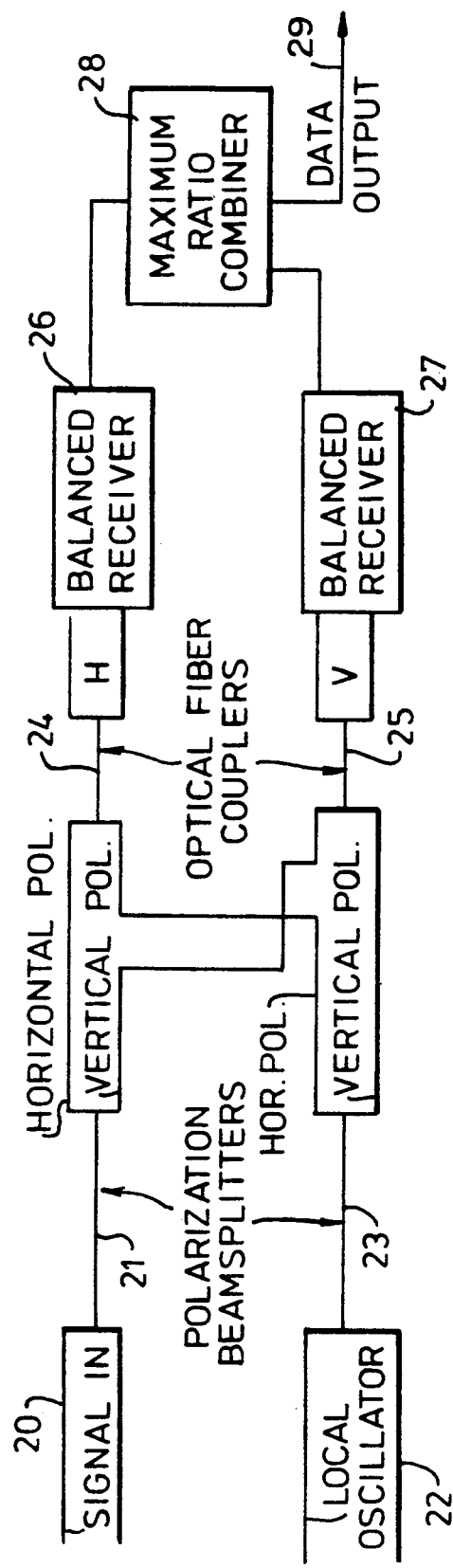

Referring now to FIG. 2 of the accompanying drawings this shows a system for monitoring polarization fluctations in optical fiber of a coherent optical transmission system. In such a system polarization fluctuations in the data signal have to be prevented to stop the fluctuations causing data errors. In FIG. 2 the incoming coherent signal is shown at 20 and this signal is split into two orthogonal states of polarization by appropriate polarization beam splitters generally indicated at 21. The output of a local oscillator 22 is also split by polarization beam splitters 23 into two orthogonal states. The outputs from the beam splitters 21 and 23 are mixed to provide two signals at 24 and 25 which fall upon two receivers 26 and 27, the receiver 26 being for the horizontally polarized signals and the receiver 27 for the vertically polarized signals. The outputs of the receivers 26 and 27 are combined in a maximum ratio combiner 28 the output 29 of which is the data output. The system just described is intended to compensate for fluctuations in polarization so that the data can be extracted correctly. It will be appreciated that as the polarization fluctuates the signals received by the receivers 26 and 27 will vary inversely with respect to each other. Accordingly in the present embodiment the outputs of the receivers 26 and 27 are monitored at 28 which detects large changes in the state of polarization of a frequency greater than a fixed value, which value may for example be 10 Hz.

Referring now to FIG. 3 of the drawings this also relates to a coherent light system but in this embodiment the incoming signal 30 is left unaffected. In the FIG. 3 embodiment a local oscillator 31 and a polarization control device 32 is used to change the state of polarization of the local oscillator 31 to that of the signal 30. The polarization control device 32 can take many forms such as fiber squeezers, fiber stretchers, liquid crystal cells or Lithium Niobate elements. In any of these forms the control device 32 consists of several elements and each element has a control voltage applied with a small dither signal. A slightly different dither frequency is applied to each element. The application of the dither frequencies is controlled by a micro-processor controller 33 which calculates how to adjust each element in the polarization control device 32 to match the local oscillators polarization state to that of the incoming signal 30. In order to do this the output of the polarization control device 32 and the incoming signal 30 are combined in an optical fiber coupler 34 and taken to a balanced receiver 35 the output of which is amplified at 36 to provide the data output 37 with the amplifier 36 also being connected to a dither frequency detection circuit 38. In this arrangement the microprocessor controller 33 continually monitors the state of polarization of the incoming signal. Accordingly the microprocessor controller 33 is also connected to an alarm circuit 39 and is programmed to raise an alarm when the input signal varies in a predetermined manner. The set of predetermined conditions to be met before an alarm is raised can include the rate of change of polarization, the magnitude of change and the duration of change.

Both of the techniques used in the embodiments of FIGS. 2 and 3 have the advantage that the signals to be used for the alarm are already present and thus implementation of the alarm is relatively simple.

I claim:

1. In a communications system for transmitting data carried by light having a polarization along an optical fiber having a data transmission characteristic, an apparatus for monitoring a disturbance to, and a change in the data transmission characteristic of, the optical fiber, said apparatus comprising:
   - detector means for detecting variations in the polarization of the light carrying the data caused by a physical disturbance to the optical fiber, and for generating a polarization fluctuation signal indicative of the disturbance and a change in the data transmission characteristic, thereby indicating potential faulty data transmission, said detector means including means for sampling non-coherent light transmitted along the optical fiber to obtain a non-coherent light sample signal, and a polarization beam splitter for converting the sample signal to the polarization fluctuation signal having a variable light power; and
   - means for screening out variations in the polarization fluctuation signal caused by natural disturbances to the optical fiber to prevent such natural disturbances from interfering with data transmission.

2. The apparatus as recited in claim 1, further comprising processor means including transducer means for converting the polarization fluctuation signal of variable power to an electrical signal of variable voltage.

3. The apparatus as recited in claim 2, wherein the screening means includes a filter for filtering the electrical signal to screen out voltage variations caused by natural disturbances to the fiber.

4. The apparatus as recited in claim 3, wherein the processor means includes comparator means for comparing the filtered signal to a preset reference voltage, and for generating a comparator output signal having a state that changes due to the comparison of the filtered signal with the reference voltage.

5. The apparatus as recited in claim 4, wherein the processor means includes counter means for counting the number of changes in state of the comparator output signal, timer means for timing a predetermined time period during which the counter means is operational, and alarm means for triggering an alarm when the number of changes in state of the comparator output signal counted during said predetermined time period exceeds a preset value.

6. In a communications system for transmitting data carried by light having a polarization along an optical fiber having a data transmission characteristic, an apparatus for monitoring a disturbance to, and a change in the data transmission characteristic of, the optical fiber, said apparatus comprising:
   - detector means for detecting variations in the polarization of the light carrying the data caused by a physical disturbance to the optical fiber, and for generating a polarization fluctuation signal indicative of the disturbance and a change in the data transmission characteristic, thereby indicating potential faulty data transmission, said detector means including means for splitting coherent light transmitted along the optical fiber to obtain a first horizontally polarized signal and a first vertically polarized signal;
   - means for screening out variations in the polarization fluctuation signal caused by natural disturbances from interfering with data transmission; and
   - processor means including an oscillator means for generating an oscillator light signal, and means for splitting the oscillator light signal to obtain a second horizontally polarized signal and a second vertically polarized signal.

7. The apparatus as recited in claim 6, wherein the processor means includes means for mixing the first and second horizontally polarized signals to obtain a combined horizontally polarized signal, and means for mixing the first and second vertically polarized signals to obtain a combined vertically polarized signal.

8. The apparatus as recited in claim 7, wherein the processor means includes a first receiver for receiving the combined horizontally polarized signal, and for generating a first receiver output signal; and a second receiver for receiving the combined vertically polarized signal, and for generating a second receiver output signal; and combiner means for combining the receiver output signals and for generating an output compensation signal.

9. In a communications system for transmitting data carried by light having a polarization along an optical fiber having a data transmission characteristic, an apparatus for monitoring a disturbance to, and a change in the data transmission characteristic of, the optical fiber, said apparatus comprising:
   - detector means for detecting variations in the polarization of the light carrying the data caused by a physical disturbance to the optical fiber, and for generating a polarization fluctuation signal indicative of the disturbance and a change in the data transmission characteristic, thereby indicating potential faulty data transmission, said detector means including coupler means for coupling coherent light transmitted along the optical fiber to a receiver;
   - means for screening out variations in the polarization fluctuation signal caused by natural disturbances to the optical fiber to prevent such natural disturbances from interfering with data transmission; and
   - processor means including oscillator means for generating an oscillator light signal having a polarization and control means for controlling the state of polarization of the oscillator light signal to match the polarization of the coherent light transmitted along the fiber.

10. The apparatus as recited in claim 9, wherein the control means includes means for generating an alarm when the polarization fluctuation signal exceeds predetermined criteria.

* * * * *